United States Patent
Griffard et al.

(10) Patent No.: US 9,963,386 B1
(45) Date of Patent: May 8, 2018

(54) METHOD OF MANUFACTURING HYDRATED LIME

(71) Applicant: Mississippi Lime Company, St. Louis, MO (US)

(72) Inventors: Randy J. Griffard, St. Mary, MO (US); Gerald K. Bequette, Ste. Genevieve, MO (US); William S. Allebach, Ste. Genevieve, MO (US); Paul J. Ramer, Ste. Genevieve, MO (US)

(73) Assignee: Mississippi Lime Company, Saint Louis, MO (US)

( * ) Notice: Subject to any disclaimer, the term of this patent is extended or adjusted under 35 U.S.C. 154(b) by 0 days. days.

(21) Appl. No.: 15/596,911

(22) Filed: May 16, 2017

Related U.S. Application Data (63) Continuation of application No. 14/180,128, filed on Feb. 13, 2014.

(60) Provisional application No. 61/772,454, filed on Mar. 4, 2013.

(51) Int. Cl.
C04B 2/04 (2006.01)
C04B 2/06 (2006.01)

(52) U.S. Cl.
CPC ............... C04B 2/04 (2013.01); *C04B 2/045* (2013.01); *C04B 2/06* (2013.01); *C04B 2/063* (2013.01)

(58) Field of Classification Search
CPC .. C04B 2/04; C04B 2/045; C04B 2/06; C04B 2/063
USPC ........................................................ 423/640
See application file for complete search history.

(56) References Cited

U.S. PATENT DOCUMENTS

| | | |
|---|---|---|
| 309,328 A | 12/1884 | Adams |
| 671,621 A | 4/1901 | Dodge |
| 1,613,341 A | 1/1927 | Carson |
| 1,679,149 A | 7/1928 | Berg |
| 1,954,211 A | 4/1934 | Kuntz |
| 2,894,820 A | 7/1959 | Rikard et al. |
| 3,366,450 A | 1/1968 | Waldeck |
| 3,839,551 A | 10/1974 | Dozsa et al. |
| 3,929,417 A | 12/1975 | Rosa et al. |
| 4,430,514 A | 2/1984 | Schack |
| 4,636,379 A | 1/1987 | Bestek et al. |
| 5,173,279 A | 12/1992 | Dumont et al. |
| 5,223,239 A | 6/1993 | Moran et al. |
| 5,277,837 A | 1/1994 | Dumont et al. |

(Continued)

FOREIGN PATENT DOCUMENTS

GB 1394330 5/1975

OTHER PUBLICATIONS

Nolan, Paul S. and Brinker, Michael R., "Hydrated Lime for Control of Acid Gas Emissions from Coal-Fired Power Plants," (12 pages).

(Continued)

*Primary Examiner* — Matthew E Hoban
*Assistant Examiner* — James Fiorito
(74) *Attorney, Agent, or Firm* — Lewis Rice LLC (57) ABSTRACT

A method of providing highly reactive hydrated lime and the resultant lime hydrate where an initial lime feed comprising calcium and impurities is first ground to a particle-size distribution with relatively course particles. Smaller particles are then removed from this ground lime and the smaller particles are hydrated and flash dried to form a hydrated lime, which is then milled to a significantly smaller particle size than that of the relatively course particles.

22 Claims, 4 Drawing Sheets

(56) References Cited

U.S. PATENT DOCUMENTS

| | | | |
|---|---|---|---|
| 5,332,436 | A | 7/1994 | Walker, Jr. et al. |
| 5,705,141 | A | 1/1998 | Dumont et al. |
| 6,200,543 | B1 | 3/2001 | Allebach et al. |
| 6,322,769 | B1 | 11/2001 | Langelin et al. |
| 7,338,649 | B2 | 3/2008 | Huege et al. |
| 7,744,678 | B2 | 6/2010 | Laudet et al. |
| 2009/0246524 | A1 | 10/2009 | Ohmi et al. |
| 2009/0264117 | A1 | 10/2009 | Tilquin et al. |
| 2011/0150755 | A1 | 6/2011 | Euston |
| 2012/0134903 | A1 | 5/2012 | Brasseur et al. |
| 2013/0156664 | A1 | 6/2013 | Jankura et al. |

OTHER PUBLICATIONS

Gale, Thomas K., Cannon, Jared W., Nolan, Paul S., Brinker, Michael R., Brasseur, Alain and Laudet, Alain, "Hydrated Lime for SO3 Removal," Paper #128 (16 pages).

Srivastava, R.K., Miller, C.A., Erickson, C. and Jambhekar, R., "Emissions of Sulfur Trioxide From Coal-Fired Power Plants," Technical Publication, Riley Power Inc, a Babcock Power Inc. company, www.babbockpower.com, presented at POWER-GEN International 2002, Dec. 10-12, 2002, Orlando, Florida (20 pages).

"A Guidebook to Particle Size Analysis," Horiba Scientific, pp. 1-29 (17 pages).

Peterson, Joseph R., Maller, Gordon, Burnette, Andrew and Rhudy, Richard G., "Pilot-Scal Evaluation of Sorbent Injection to Remove SO3 and HCL," Managing Hazardous Air Pollutants State of the Art, Electric Power Research Institute TR-101890, printed Nov. 16, 2009, pp. 520-538 (22 pages).

Oates, Lime and Limestone: Chemistry and Technology, Production and Use, 2007, Chapter 17, pp. 192-198 (8 pages).

METHOD OF MANUFACTURING HYDRATED LIME

CROSS REFERENCE TO RELATED APPLICATION(S)

This application is a Continuation of U.S. Utility patent application Ser. No. 14/180,128, filed Feb. 13, 2014, which, in turn, claims benefit of U.S. Provisional Application Ser. No. 61/772,454 filed Mar. 4, 2013. The entire disclosure of both the above documents is herein incorporated by reference.

BACKGROUND OF THE INVENTION

1. Field of the Invention

This disclosure is related to the field of quicklime products and the methods of manufacturing thereof, specifically to methods of manufacturing compositions comprising calcium hydroxide—more commonly called hydrated lime or lime hydrate that has a high purity and high surface area and is highly reactive.

2. Description of the Related Art

Many efforts have been made to develop materials for improved capability of cleaning or "scrubbing" flue gas or combustion exhaust. Most of the interest in such scrubbing of flue gas is to eliminate particular compositions, specifically acid gases, that contribute to particularly detrimental known environmental effects, such as acid rain.

Flue gases are generally very complex chemical mixtures which comprise a number of different compositions in different percentages depending on the material being combusted, the type of combustion being performed, impurities present in the combustion process, and specifics of the flue design. However, the release of certain chemicals which commonly appear in flue gases into the atmosphere is undesirable, and therefore their release is generally regulated by governments and controlled by those who perform the combustion.

Some of the chemicals that are subject to regulation are certain acid gases. A large number of acid gases are desired to be, and are, under controlled emission standards in the United States and other countries. This includes compounds such as, but not limited to, hydrogen chloride (HCl), sulfur dioxide ($SO_2$) and sulfur trioxide ($SO_3$). Sulfur trioxide can evidence itself as condensable particulate in the foil of sulfuric acid ($H_2SO_4$). Condensable particulate can also be a regulated emission. Flue gas exhaust mitigation is generally performed by devices called "scrubbers" that introduce chemical compounds into the flue gas that then react with the compounds to be removed by either allowing them to be captured and disposed of, or allowing them to be reacted into a less harmful compound prior to their exhaust, or both. In addition to controlling the emissions for environmental reasons, it is desirable for many combustion plant operators to remove acid gases from their flue gas to prevent the acid gases from forming powerful corroding compounds which can damage flues and other equipment.

These acid gases can arise from a number of different combustion materials, but are fairly common in fossil fuel combustion (such as oil or coal) due to sulfur being present as a common contaminant in the raw fuel. Most fossil fuels contain some quantity of sulfur. During combustion, sulfur in the fossil fuel can oxidize to form sulfur oxides. A majority of these oxides forms sulfur dioxide ($SO_2$), but a small amount of sulfur trioxide ($SO_3$) is also formed. Selective Catalyst Reduction (SCR) equipment, commonly installed for the removal of nitrogen oxides ($NO_x$), will also oxidize a portion of the $SO_2$ in a flue gas to $SO_3$. Other components of the process (iron, etc.) can increase the amount of $SO_3$ that forms in the flue gas. Particularly in coal combustion, where the chemical properties of the coal are often highly dependent on where it is mined, the ability to mitigate the amount of sulfur oxides in flue gas is highly desirable as it allows for lower quality raw coal (which may be less expensive to produce and more abundant) to be burned sufficiently cleanly to lessen environmental impact and impact on machinery.

$SO_2$ is a gas that contributes to acid rain and regional haze. Since the 1970's, clean air regulations have been designed to reduce emissions of $SO_2$ from industrial processes at great benefit to the environment and human health. For large emitters, the use of wet and dry scrubbing has led to the reduction of $SO_2$. Smaller emitters, however, seek out less costly capital investment to control $SO_2$ emissions in order to remain operating and produce electricity or steam. Similarly, halides in fossil fuels (Cl and F) are combusted and form their corresponding acid in the flue gas emissions. The halogenated acids also contribute to corrosion of internal equipment or, uncaptured, pollute the air via stack emissions.

Mitigation, however, can be very difficult. Because of the required throughput of a power generation facility, flue gases often move through the flue very fast and thus, are present in the area of scrubbers for only a short period of time. Further, many scrubbing materials often present their own problems. Specifically, having too much of the scrubbing material could cause problems with the plant's operation from the scrubber material clogging other components or building up on moving parts.

Flue gas treatment has become a focus of electric utilities and industrial operations due to increasingly tighter air quality standards. As companies seek to comply with air quality regulations, the need arises for effective flue gas treatment options. Alkali species based on alkali or alkaline earth metals are common sorbents used to neutralize the acid components of the flue gas. The most common of these alkalis are sodium, calcium, or magnesium-based. A common method of introduction of the sorbents into the gas stream is to use dry sorbent injections. The sorbents are prepared as a fine or coarse powder and transported and stored at the use site. Dry sorbent injection systems pneumatically convey powdered sorbents to form a fine powder dispersion in the duct. The dry sorbent neutralizes $SO_3$/$H_2SO_4$, and protects equipment from corrosion while eliminating acid gas emissions. Common sorbents used are sodium (trona or sodium bicarbonate) or calcium (hydrated lime, $Ca(OH)_2$) based.

One commonly used material for the scrubbing of acid gases is hydrated lime. It has been established that hydrated lime can provide a desirable reaction to act as a mitigation agent. Hydrated lime reacts with $SO_3$ to form calcium sulfate in accordance with the following equation:

$$SO_3(g)+Ca(OH)_2(s)\rightarrow CaSO_4(s)+H_2O(g)$$

Hydrated lime systems have been proven successful in many full scale operations. These systems operate continuously to provide utility companies with a dependable, cost-effective means of acid gas control.

These hydrated lime compositions specifically focus on high surface area based on the theories of Stephen Brunauer, Paul Hugh Emmett, and Edward Teller (commonly called the BET theory and discussed in S. Brunauer, P. H. Emmett and E. Teller, J. Am. Chem. Soc., 1938, 60, 309, the entire disclosure of which is herein incorporated by reference). This methodology particularly focuses on the available surface area of a solid for absorbing gases—recognizing that a surface, in such circumstances, can be increased by the presence of pores and related structures. The most effective hydrated lime sorbents for dry sorbent injection have high (>20 m²/g) BET surface area. Two examples of such compositions with increased BET surface areas are described in U.S. Pat. Nos. 5,492,685 and 7,744,678, the entire disclosures of which are herein incorporated by reference. Because of this, commercially available products are currently focused on obtaining lime hydrate with particularly high BET surface areas. It is generally believed that the BET surface area really needs to be above 20 m²/g to be effective, and in many recent hydrated lime compositions the BET surface area is above 30 m²/g in an attempt to continue to improve efficiency. These sorbents offer good conveying characteristics and good dispersion in the flue gas, which is necessary for high removal rates. Use of a higher quality, high reactivity source of hydrated lime allows for better stoichiometric ratios than previous attempts that utilized lower quality hydrated lime originally targeted for other industries such as wastewater treatment, construction, asphalt, etc.

The reaction of hydrated lime with acid gas (such as $SO_3$) is generally assumed to follow the diffusion mechanism. The acid gas removal is the diffusion of $SO_3$ from the bulk gas to the sorbent particles. Thus, high surface area does not itself warrant a prediction in improved removals of acid gases. Specifically, high pore volume of large pores is generally believed to be required to minimize the pore plugging effect and, therefore, BET surface area has been determined to be a reasonable proxy for effectiveness of lime hydrates in removal of acid gases. Conventional wisdom also indicates that smaller particles act as better sorbents.

Lime hydrate meeting the above described characteristics, properties, and reactivity has generally been manufactured according to a commonly known and utilized process. First, a lime feed of primarily calcium oxide (commonly known as quicklime) is continuously grinded using a pulverizing mill until a certain percentage of all the ground particles meet a desired size (e.g., 95% or smaller than 100 mesh). In other words, all of the lime feed is ground together (lime and impurities), without any removal of particles during the grinding, until the batch of lime feed (both the lime and impurities) meets the desired particle size requirements. This continuous grinding is not surprising as the conventional wisdom is that small particles are better and, thus, the more the calcium oxide is grinded the better.

Second, the quicklime meeting the desired size requirements is then fed into a hydrator, where the calcium oxide reacts with water (also known as slaking), and then flashed dried to form calcium hydroxide in accordance with the following equation:

$$CaO + H_2O \rightarrow Ca(OH)_2$$

Finally, the resultant calcium hydroxide (also known as hydrated lime) is then milled and classified until it meets a desired level of fineness and BET surface area.

Despite the wide use of the above described process, there still exist many problems and there remains a desire to produce a more highly reactive and higher purity hydrated lime. Accordingly, there is a need in the art for a more effective method of manufacturing hydrated lime.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Described herein, among other things, is a method of producing hydrated lime and the resultant lime hydrate where an initial lime feed comprising calcium and impurities is first ground to a particle-size distribution with relatively course particles. Smaller particles are then removed from this ground lime and the smaller particles are hydrated and flash dried to form a hydrated lime, which is then milled to a significantly smaller particle size than that of the relatively course particles.

There is described herein, in an embodiment, a method of producing hydrated lime, the method comprising: providing a lime feed comprising calcium oxide and impurities; milling the lime feed to produce a fine ground lime, wherein the fine ground lime has a particle-size distribution of less than 80% minus 200 mesh; feeding the fine ground lime into an air classification system; removing a refined fine lime from the air classification system wherein the refined fine lime has a particle size distribution of greater than 70% minus 200 mesh; adding water to the refined fine lime to form damp hydrated lime; and flash-drying the damp hydrated lime to form dried hydrated lime.

In an embodiment, the method further comprises, milling the dried hydrated lime to a particle-size distribution of at least 98% minus 325 mesh.

In an embodiment of the method, the lime feed comprises no less than 94% calcium oxide and greater than 0% impurities.

In an embodiment of the method, the dried hydrated lime comprises greater than 96% calcium hydroxide.

In an embodiment of the method, the dried hydrated lime has a reactivity in citric acid of 10 seconds or less.

In an embodiment of the method, the dried hydrated lime has a BET particle surface area of greater than 30 m²/g.

In an embodiment of the method, the lime feed comprises about 94% calcium oxide and about 6% impurities.

In an embodiment of the method, the dried hydrated lime comprises greater than 96% calcium hydroxide.

In an embodiment of the method, the dried hydrated lime has a reactivity in citric acid of 10 seconds or less.

In an embodiment of the method, the dried hydrated lime has a BET particle surface area of greater than 30 m²/g.

In an embodiment of the method, the fine ground lime has a particle-size distribution of less than 70% minus 200 mesh.

In an embodiment of the method, the fine ground lime has a particle-size distribution of between 50% to 60% minus 200 mesh.

In an embodiment of the method, the refined fine lime has a particle size distribution of greater than 80% minus 200 mesh.

In an embodiment, the method is performed in a low $CO_2$ environment.

There is also described herein a method of producing hydrated lime and the resultant hydrated lime produced by the method, the method comprising: providing a lime feed having greater than 0% impurities; milling the lime feed to produce a fine ground lime, wherein the fine ground lime has a particle-size distribution of less than 80% minus 200 mesh;

feeding the fine ground lime into an air classification system; removing a refined fine lime from the air classification system wherein the refined fine lime has a particle size distribution of greater than 70% minus 200 mesh; adding water to the refined fine lime to form damp hydrated lime; flash-drying the damp hydrated lime to form dried hydrated lime; and milling the dried hydrated lime to a particle-size distribution of at least 98% minus 325 mesh; wherein the dried hydrated lime has a BET particle surface area of greater than 30 $m^2/g$.

In an embodiment of the method, the fine ground lime has a particle-size distribution of less than 70% minus 200 mesh.

In an embodiment of the method, the fine ground lime has a particle-size distribution of between 50% to 60% minus 200 mesh.

In an embodiment of the method, the refined fine lime has a particle size distribution of greater than 80% minus 200 mesh.

In an embodiment of the method, the method is performed in a low $CO_2$ environment.

DETAILED DESCRIPTION OF THE PREFERRED EMBODIMENT(S)

In general, lime feed is subjected to a multi-stage manufacturing process (including grinding, classification, hydration, drying, etc.) wherein the resultant product is largely calcium hydroxide. The resultant hydrated lime product is highly reactive and has a very high purity and surface area and very small particle size. More specifically, in one embodiment, the hydrated lime has a reactivity in citric acid of 10 seconds or less, a concentration of greater than or equal to about 96% calcium hydroxide, a particle surface area of greater than 30 $m^2/g$, and a particle size of less than 44 micron for about 98% of the particles.

It should be noted that values for the reactivity, purity, surface area, and particle size discussed herein are merely exemplary and preferred, and in no way limiting. As would be understood by one of ordinary skill in the art, by altering some or all processing conditions discussed above or the purity of the initial lime feed, other reactivity, purity, surface area, and particle size values for the final hydrated lime product can easily be achieved in accordance with the below described manufacturing process.

In order to test reactivity of particular lime hydrate compounds, in an embodiment, the reactivity to a weak acid (such as, but not limited to, citric acid) provides for a reactivity time that is measurable with commercial instruments. The problem with determining reaction time to stronger acids is that the reaction can be too quick to effectively measure at laboratory scaling. Thus, it is difficult to predict compositions that will function well without performing large scale pilot testing. In order to determine the citric acid reactivity of a particular hydrated lime composition, the amount of time it took 1.7 grams of lime hydrate to neutralize 26 grams of citric acid was measured. As a measurement of effectiveness, it is preferred that this value be less than or equal to 10 seconds in order to have a hydrated lime composition which is classified as being "high reactive". However in an alternative embodiment it can be less than 8 seconds. It is more preferred that this value be 4 or less, 3 or less, 2 or less or 1 or less. Again, given the practical realities that production of improved material often results in a product having dramatically increased costs of products, utilizing current manufacturing techniques and for current emissions standards, in an embodiment the lime hydrate may be in the 2-5 second range, or, in another embodiment, in the 3-4 second range.

The "lime feed" (also known as "quicklime" and used synonymously herein) that is utilized in the initial stages of the methods disclosed herein refers to calcium oxide which is generally made by the thermal decomposition of limestone (predominately calcium carbonate) in a lime kiln. This is accomplished by a process called calcination or lime-burning (by heating the material to an extremely high temperature), which liberates the molecule of carbon dioxide ($CO_2$), leaving quicklime. The quicklime, however, is not pure calcium oxide and includes other impurities (e.g., residual uncalcined stone, dead burned lime, silica nodules, metal oxides, etc.). In some instances, the lime feed may have a chemical purity as low as 94% (i.e., 94% Calcium Oxide (CaO) and 6% impurities). In other instances, the lime feed may have a chemical purity less than 94% but greater than 90%, or less than 90%. In one embodiment, the purity will be about 93%. In still further instances, the lime feed may be greater than 94% CaO. In any event, the lime feed discussed herein is not limited to any particular purity of CaO, unless otherwise noted.

Figure 1:
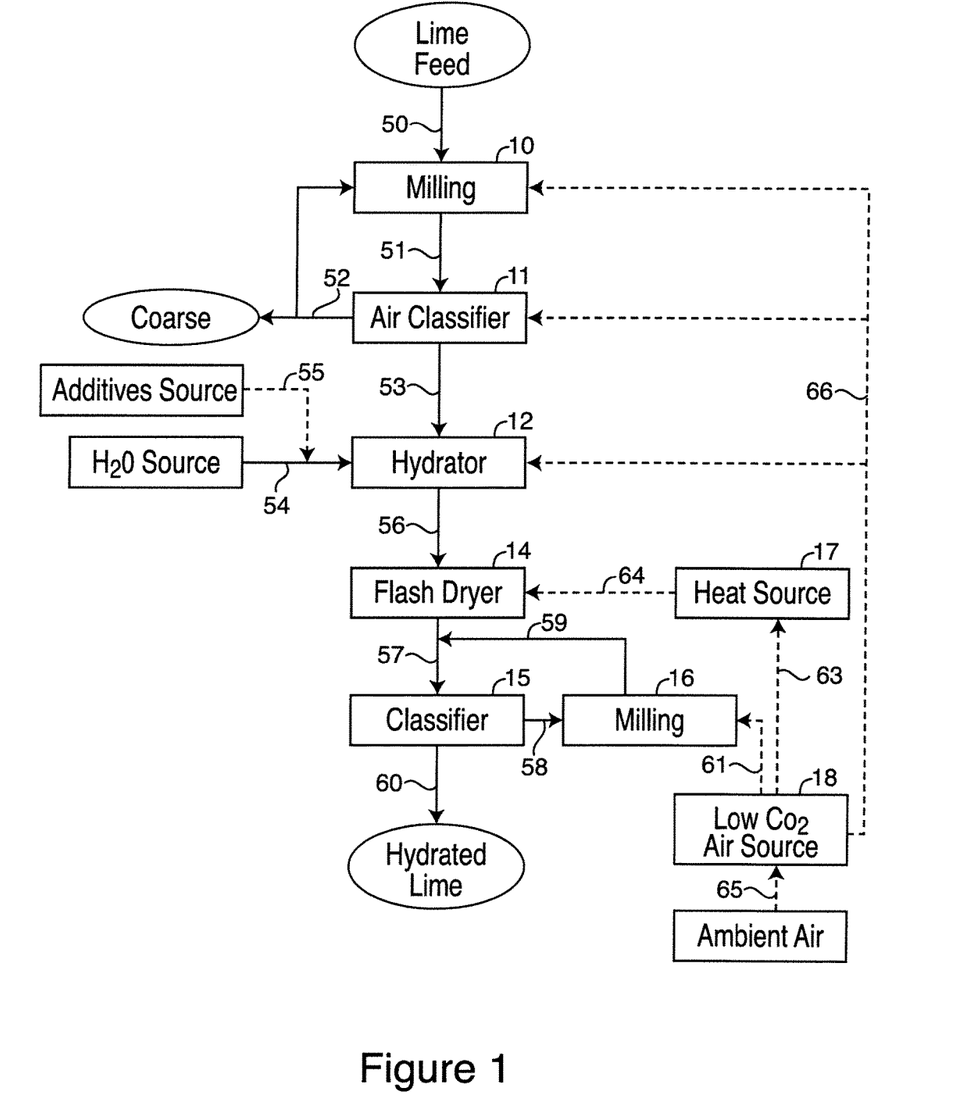
FIG. 1 depicts a block diagram of an embodiment of a method of manufacturing hydrated lime.

Turning now to FIG. 1, a general block diagram of the method of manufacturing hydrated lime will be described in more detail in accordance with several embodiments. Lime feed (50) is subjected to fine grinding or milling (10) to produce a fine ground lime (51). The fine ground lime can be of varying sizes in different embodiments but generally has a particle-size distribution of less than 80% minus 200 mesh. That is, the lime feed (50) is ground significantly coarser than the desired end product. In a preferred embodiment, the fine ground lime has a particle-size distribution of about 50% to about 60% minus 200 mesh. Any grinding or milling is suitable, including, for example, fine grind cage mill, swing hammer mill, screen mill, etc. where the amount of milling produces the desired particle-size distribution.

After being milled, the fine ground lime (51), including the impurities, then passes through an air classification system (11). The air classification system (11) generally comprises an air classifier (e.g., a standard Raymond or Sturtevant air classifier) or a turbine classifier. The air classification system (11) generally comprises two steps, which may be performed consecutively or concurrently.

As noted above, the lime feed (50)—and fine ground lime (51)—generally will include various different impurities. Without being limited to a particular particle-size distribution, it is believed that grinding the lime feed (50) to a particle-size distribution of about 50% to about 60% minus 200 mesh grinds a majority of the calcium oxide to the desired particle-size distribution (i.e., passing a 200 mesh screen) but does not grind the harder impurities to a size below 200 mesh. In other words, the harder impurities are larger than 200 mesh while most of the lime particles are smaller than 200 mesh. As a result, removal of the impurities becomes easier and at an earlier stage of the manufacturing process as discussed below.

In the air classification system (11), the harder impurities are then removed and a refined fine lime (53) is produced. As the name implies, the refined fine lime (53) will have a smaller particle-size distribution than both the fine ground lime (51) and the lime feed (50) as the larger particles from the fine ground lime (51) are removed. In a preferred embodiment, the refined fine lime (53) will have a particle-size distribution of greater than about 80% minus 200 mesh. In another embodiment, it will be greater than 93.5% 200 mesh. In some embodiments, though, the particle-size distribution will be less than about 80% minus 200 mesh (e.g., greater than 70% minus 200 mesh, with the fine ground lime (51) having a particle-size distribution of less than 70% minus 200 mesh). The coarse fraction (52) (i.e., the portion of the fine ground lime (51) from the air classifier system (11) larger than 200 mesh and which is believed to include a higher percentage of the impurities than the lime feed (50)) is then removed and can be used, for example, as a de-dusted fine granular lime. In some embodiments, the coarse fraction (52) may be fed into the mill (10) for grinding to the desired particle-size distribution discussed above and then again fed into the air classifier system (11). This additional re-grinding of the coarse fraction (52) can continue as many times as desired or necessary, but is by no means required. In some instances, however, such re-grinding ensures that the maximum amount of calcium oxide from the lime feed (50) can be utilized in generating the desired hydrated lime, as discussed below.

As can be seen from Table 1 below, the combination of the mill (10) and air classification system (11) results in refined fine lime (53) with a higher purity (i.e., less impurities and higher concentration of CaO).

TABLE 1

| Sample Description | Feed Composition | | | | | | | |
|---|---|---|---|---|---|---|---|---|
| | CaO | $CaCO_3$ | MgO | $SiO_2$ | $Al_2O_3$ | $Fe_2O_3$ | Sulfur | MnO |
| Feed to Mill (50)/ Classifier (51) | 93.95 | 1.42 | 1.040 | 0.800 | 0.101 | 0.099 | 0.024 | 46 |
| Refined Fine Lime (53) | 95.32 | 0.63 | 0.825 | 0.730 | 0.083 | 0.095 | 0.026 | 45 |

It should also be noted that although the above description refers to particles passing through a mesh, this description and use of mesh merely refers to the common use of the term mesh as it relates to particle-size distribution. A mesh screen or sieve need not be used to measure or classify the particle-size. Instead, the air classification system described above is used, which generally separates particles less than 200 mesh from particles greater than 200 mesh.

Without being limiting to any particular theory of operation, it is believed that the removal of potential impurities from the lime feed (50) (and fine ground lime (51)) improves the reactivity of the final hydrated lime product. As noted above, the impurities are often harder than the calcium oxide and thus harder to grind. As a result, efficiencies are wasted during this milling step if the lime feed is continuously milled until the batch of lime feed meets the desired size requirements. Additionally, the continuous milling step of the prior art leads to ultrafine calcium oxide particles. It is believed these ultrafine calcium oxide particles results in a less reactive final hydrated lime product as the smaller particles results in the formation of more agglomerates, and thus less reactivity of the final hydrated lime product. Finally, the refined fine lime (53) without impurities helps resolve a major problem of localized overheating of the lime during the subsequent hydration that was commonly seen in the prior art. The end result, and the remaining processing steps below, is the production of a small average diameter particle and a more reactive resultant lime hydrate.

As quicklime is generally not stable and, when cooled, will spontaneously react with $CO_2$ from the air until, after enough time, it is completely converted back to calcium carbonate, all the milling and classification of the quicklime should preferably be produced entirely in a closed-circuit system to prevent air slaking and recarbonation (i.e., CaO to $CaCO_3$) from occurring, although a closed-circuit system is by no means required. In some embodiments, additional measures are employed to prevent recarbonation. For example, conditioned low $CO_2$ air (18) can be injected (66) into these systems to replace any air being drawn in and around process equipment bearings and seals. This conditioned air (18) is also very useful if the quicklime needs to be pneumatically conveyed. The process for conditioning this air is discussed more fully below and is also described in U.S. Pat. No. 6,200,543 (the entire disclosure of which is incorporated herein by reference).

As noted above, the refined fine lime (53) from the air classification system (11) then undergoes a hydration or slaking process (12). The hydration process (12) generally comprises a hydrator, and in a preferred embodiment, the refined fine lime (53) is combined with an excess of water (54) and rapidly mixed which allows the calcium oxide to react with the water to form damp calcium hydroxide (hydrated lime). The water (54) for hydration is generally fed at a reasonably high temperature but low enough that the refined fine lime (53) is not overheated (burned). In this regard, the water feed (54) and hydrator (12) temperature should be maintained below the boiling point of water, and more preferably, at a temperature equal to or below 180° F. Utilizing an excess of water (i.e., more than necessary to react with the CaO) also helps prevent overheating and burning and helps separate the individual particles. In any event, the damp hydrated lime (56) that leaves the hydrator (12) should have residual moisture of about 5-35%, and more preferably, about 10-25%.

In addition to the water, other additives (55) may be included in the water feed (54) that is utilized in the hydration process (53). These additives can help improve the reaction rate of the final hydrated lime product. These additives are generally accelerators or retarders, which, as their names suggest, accelerate or retard the reaction of calcium oxide to calcium hydroxide. Any known accelerators or retarders can be utilized, including, alkaline-earth chlorides (e.g., barium chloride, calcium chloride, sodium chloride, potassium chloride, aluminum chloride, etc.), other salts (e.g., aluminum nitrate, sodium carbonate, sodium borate, potassium permanganate, potassium chlorate, table salt, Rochelle salt, etc.), acids (e.g., hydrochloric acid, sulfuric acid, oxalic acid, nitric acid, acetic acid, lactic acid, etc.), alkanols (e.g., mono-, di-, and tri-ethanolamine, dimethylethanolamine, methyl diethanolamine, triisopropanolamine, etc.), and sugars. Further examples of such accelerators and retarders, and their use in hydrated lime production can be found in U.S. Pat. Nos. 1,583,759; 1,649,602; 1,664,598; 2,193,391; 2,423,335; 2,437,842; 3,120,440; 4,626,418; 4,786,485; 5,173,279; 5,306,475; 5,308,534; 5,332,436; 5,502,021; 5,618,508; 5,705,141;

6,322,769; and 7,744,678 (the entire disclosures of which are incorporated herein by reference).

This damp hydrated lime (56) is then dried (14). In a preferred embodiment, the damp hydrated lime (57) is flash-dried using air (64) from an indirect heat source (17) with a temperature of about 550° F. to about 850° F. Using indirect heat prevents the hydrate from contacting the combustion gas which can occur if a direct heat source were to be used. This contact would result in the loss of some of the available calcium hydroxide. In any event, the dried hydrated lime (57) generally will have a residual moisture content of about 1% or less.

As noted above, the presence of $CO_2$ in air which then comes in contact with the hydrated lime can compromise the chemical integrity of the hydrated lime. While hydrated lime has greater moisture stability than calcium oxide, hydrated lime is perishable unless adequately protected from $CO_2$ absorption and the introduction of $CO_2$ into the hydrated lime can result in recarbonation (i.e., $Ca(OH)_2$ to $CaCO_3$). Thus, in some embodiments, the chemical purity can be further improved if the indirect heater is supplied with conditioned air (63) that has a reduced $CO_2$ content. Examples of apparatuses and methods for such air conditioning (i.e., reduction of $CO_2$ content in the air stream) are disclosed, for example, in U.S. Pat. Nos. 5,678,959 and 6,200,543 (the entire disclosures of which are incorporated herein by reference). In one preferred embodiment, ambient air (65) (e.g., about 300 ppm $CO_2$) is fed into an air conditioner (18), resulting in conditioned air (63) with a $CO_2$ concentration of less than 100 ppm $CO_2$. The benefits of this low $CO_2$ conditioned air can be seen in Table 2 below, which shows various compositions and BET surface area dried hydrated lime depending on the amount of $CO_2$ in the air used to dry the damp hydrated lime.

TABLE 2

Effect of $CO_2$ in Drying Air

| | Available $Ca(OH)_2$ | % $CO_2$ in Hydrate | % $CaCO_3$ | B.E.T. Surface Area |
|---|---|---|---|---|
| 11-12% $CO_2$ | 80-84% (82.54% avg.) | 6.4-7.2% (6.75% avg.) | 15.34% | 32-33 $m^2/g$ (32.57 avg.) |
| 560 ppm | 93.5-94.5% (94.06% avg.) | 1-1.2% (1.01% avg.) | 2.29% | 35-38 $m^2/g$ (37.77 avg.) |
| 120 ppm | 94-95% (94.64% avg.) | 0.6-0.7% (0.62% avg.) | 1.41% | 37-39 $m^2/g$ (38.81 avg.) |

As noted above, conditioned air (66) with the same or different CO2 concentrations as the conditioned air (63) for drying can also be fed into the mill (10), air classification system (11), and/or hydrator (12) to help prevent recarbonation. Additionally, conditioned air (61) can be fed into any additional classifiers (15) and/or mills (16), if present and as discussed more fully below.

After being dried (14), the dried hydrated lime (57) is then classified (15) and milled (16). The dried hydrated lime (57) is first fed into a classifier (15). If it meets the desired properties (e.g., those discussed herein, including purity reactivity, BET surface area, and particle size), dried hydrated lime (57) is utilized as the final hydrated lime product (60). Some of the dried hydrated lime (57), however, may not meet the desired properties. This non-final hydrated lime (58) is then fed into the mill (16) to be grinded, with the grinded hydrated lime (59) being fed back into the classifier (15) to determine if the material can be utilized as the final hydrated lime product (60). This process of milling (16) and classifying (15) can continue for as long as is necessary.

Again, in a preferred embodiment, the milling (15) and classification system (16) are conducted in a closed circuit system to prevent air carbonation from occurring. Conditioned air (61) (i.e., low CO2) can further be injected into the milling (15) and classification system (16) to replace any transient air being drawn into the process and prevent recarbonation.

Figure 2:
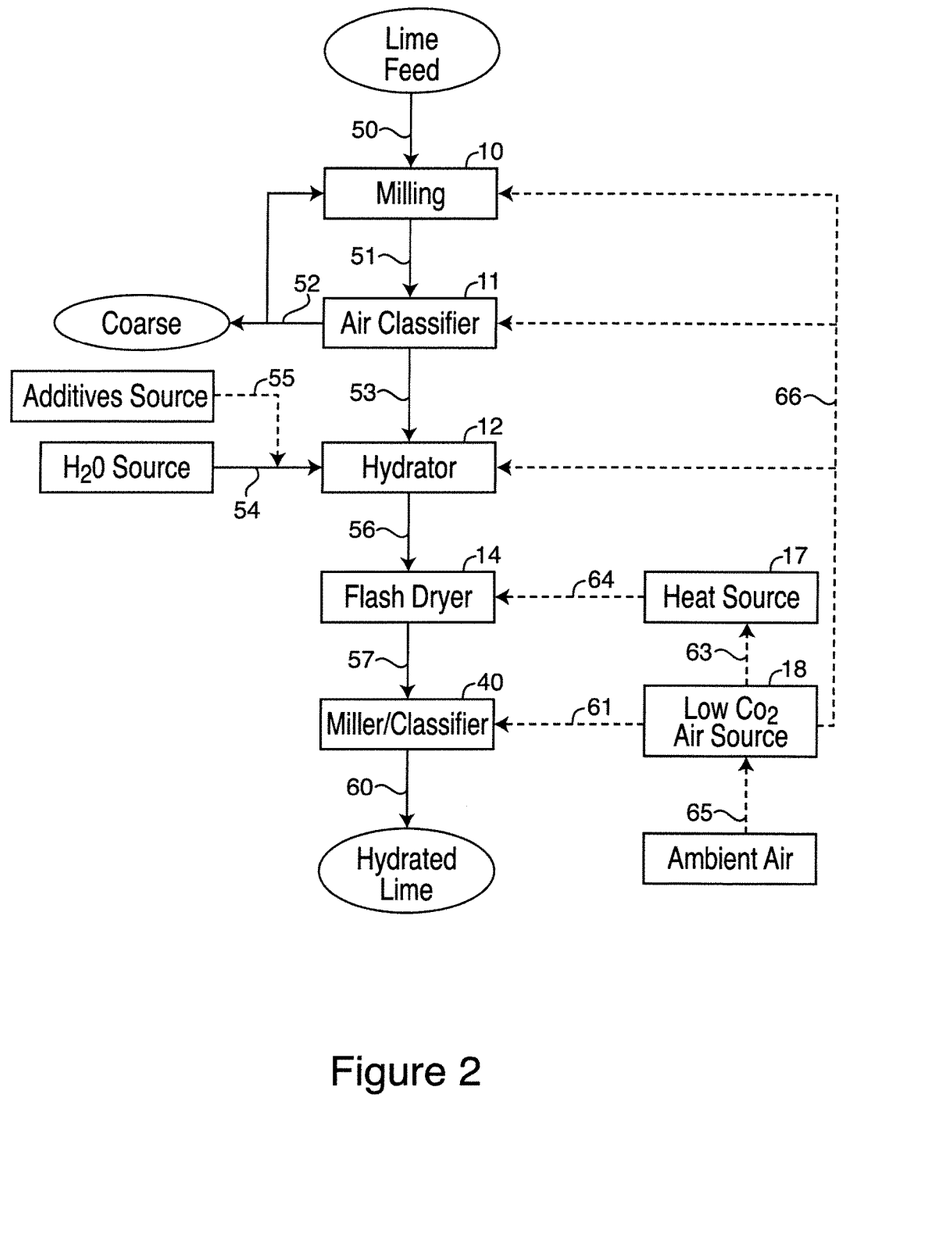
FIG. 2 depicts a block diagram of an embodiment of a portion of a method of manufacturing hydrated lime showing an integrated milling and classification system.
Figure 3:
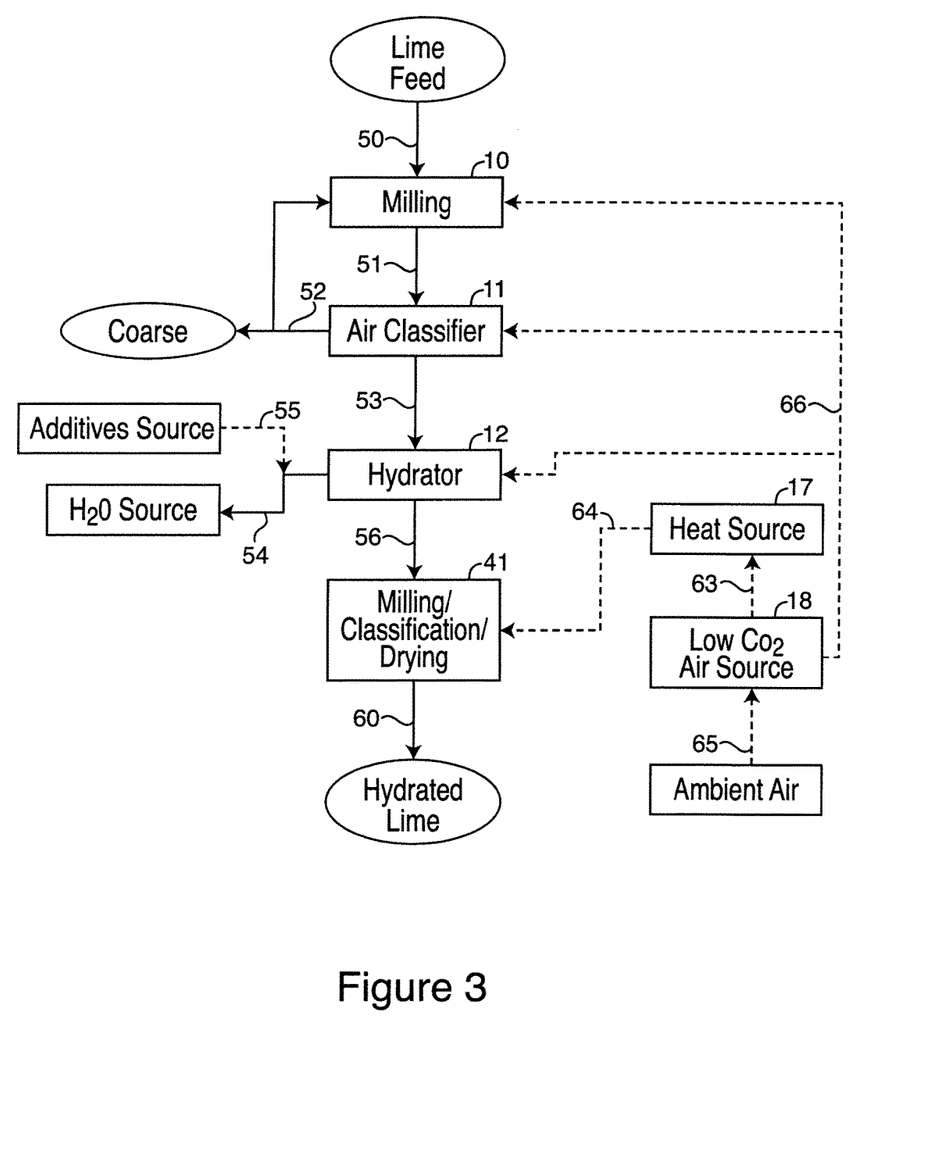
FIG. 3 depicts a block diagram of an embodiment of a portion of a method of manufacturing hydrated lime showing an integrated milling, classification, and drying system.

The above process of manufacturing describes a process in which the drying (14), classifying (15), and milling (16) of the damp hydrated lime (56) are conducted independently. As would be understood by one of ordinary skill in the art, milling and classification system can be, and commonly are, integrated into one system. An example of an integrated milling and classification system is depicted in FIG. 2, wherein dried hydrated lime (57) is fed into the milling/classification system (40) with injected conditioned air (61) and the resultant final hydrated lime product (60) has the desired properties as discussed above. Similarly, an integrated milling and classification system can be further integrated into a dryer. An example of such a fully integrated system is depicted in FIG. 3, wherein the damp hydrated lime (56) is fed into the milling/classification/dryer system (41) with an indirect heat source (64) and the resultant final hydrated lime product (60) has the desired properties as discussed above.

Figure 4:
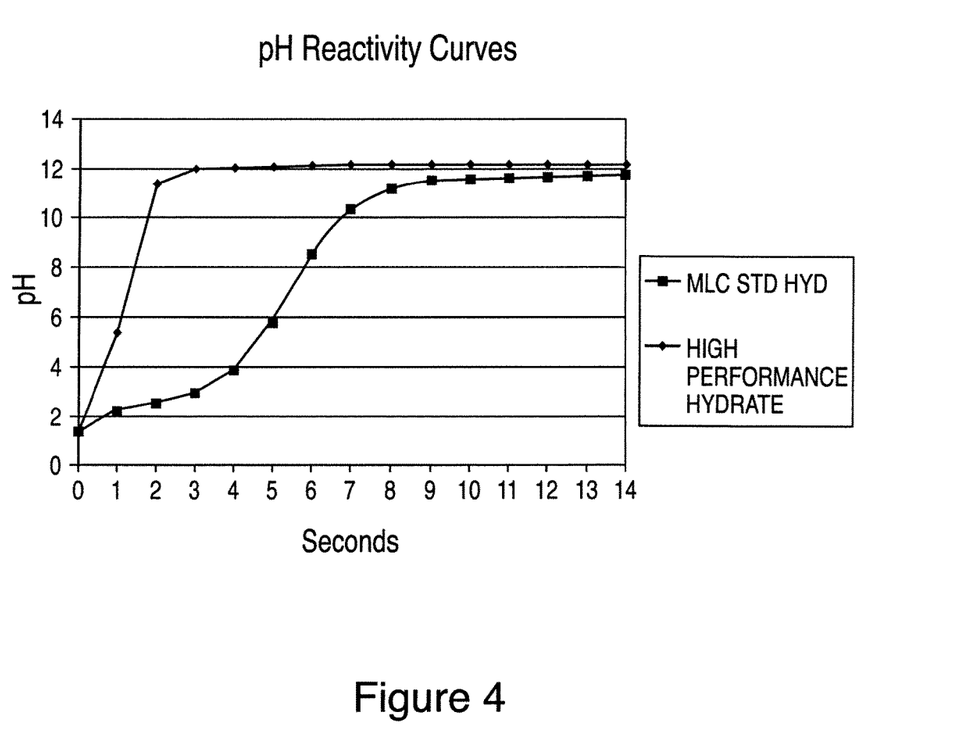
FIG. 4 depicts the reactivity of a standard hydrated lime as compared to the reactivity of hydrated lime produced according to an embodiment of a method of manufacturing hydrated lime disclosed herein.

In any event, embodiments of the manufacturing process described herein result in a final hydrated lime product (60) with a high purity and high reactivity. In particular embodiments, the final hydrated lime product (60) has a purity of 96% calcium hydroxide or greater, a reactivity in citric acid of less than 10 seconds, a BET surface area of greater than 30 $m^2/g$, and a particle size of less than about 44 microns (325 mesh) for about 98% of the particles. As can be seen from FIG. 4, lime produced by the manufacturing processes described herein has a much faster reactivity over lime produced by conventional methods.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A method of producing hydrated lime, the method comprising:
   providing a lime feed comprising calcium oxide and impurities;
   milling said lime feed to produce a fine ground lime, wherein said fine ground lime has a particle-size distribution of less than 80% minus 200 mesh;
   feeding said fine ground lime into an air classification system;

removing a refined fine lime from said air classification system wherein said refined fine lime is finer than said fine ground lime and has a particle size distribution of greater than 70% minus 200 mesh;

adding water to said refined fine lime to form damp hydrated lime; and flash-drying said damp hydrated lime to form dried hydrated lime.

2. The method of claim 1 further comprising, milling said dried hydrated lime to a particle-size distribution of at least 98% minus 325 mesh.

3. The method of claim 1, wherein said lime feed comprises no less than 94% calcium oxide and greater than 0% impurities.

4. The method of claim 3, wherein said dried hydrated lime comprises greater than 96% calcium hydroxide.

5. The method of claim 4, wherein said dried hydrated lime has a reactivity in citric acid of 10 seconds or less.

6. The method of claim 4, wherein said dried hydrated lime has a BET particle surface area of greater than 30 $m^2/g$.

7. The method of claim 1, wherein said lime feed comprises about 94% calcium oxide and about 6% impurities.

8. The method of claim 7, wherein said dried hydrated lime comprises greater than 96% calcium hydroxide.

9. The method of claim 8, wherein said dried hydrated lime has a reactivity in citric acid of 10 seconds or less.

10. The method of claim 8, wherein said dried hydrated lime has a BET particle surface area of greater than 30 $m^2/g$.

11. The method of claim 1, wherein said fine ground lime has a particle-size distribution of less than 70% minus 200 mesh.

12. The method of claim 11, wherein said fine ground lime has a particle-size distribution of between 50% to 60% minus 200 mesh.

13. The method of claim 12, wherein said refined fine lime has a particle size distribution of greater than 80% minus 200 mesh.

14. The method of claim 1, wherein said refined fine lime has a particle size distribution of greater than 80% minus 200 mesh.

15. The method of claim 1, wherein said method is performed in a low $CO_2$ environment.

16. A method of producing hydrated lime, the method comprising:

providing a lime feed having greater than 0% impurities;

milling said lime feed to produce a fine ground lime, wherein said fine ground lime has a particle-size distribution of less than 80% minus 200 mesh;

feeding said fine ground lime into an air classification system;

removing a refined fine lime from said air classification system wherein said refined fine lime is finer than said fine ground lime and has a particle size distribution of greater than 70% minus 200 mesh;

adding water to said refined fine lime to form damp hydrated lime;

flash-drying said damp hydrated lime to form dried hydrated lime; and milling said dried hydrated lime to a particle-size distribution of at least 98% minus 325 mesh;

wherein said dried hydrated lime has a BET particle surface area of greater than 30 $m^2/g$.

17. The dried hydrated lime produced in accordance with the method of claim 16.

18. The method of claim 16, wherein said fine ground lime has a particle-size distribution of less than 70% minus 200 mesh.

19. The method of claim 18, wherein said fine ground lime has a particle-size distribution of between 50% to 60% minus 200 mesh.

20. The method of claim 19, wherein said refined fine lime has a particle size distribution of greater than 80% minus 200 mesh.

21. The method of claim 16, wherein said refined fine lime has a particle size distribution of greater than 80% minus 200 mesh.

22. The method of claim 16, wherein said method is performed in a low $CO_2$ environment.

* * * * *